June 17, 1952     M. J. LESTER     2,600,665
FISHHOOK CONTAINER
Filed April 6, 1948
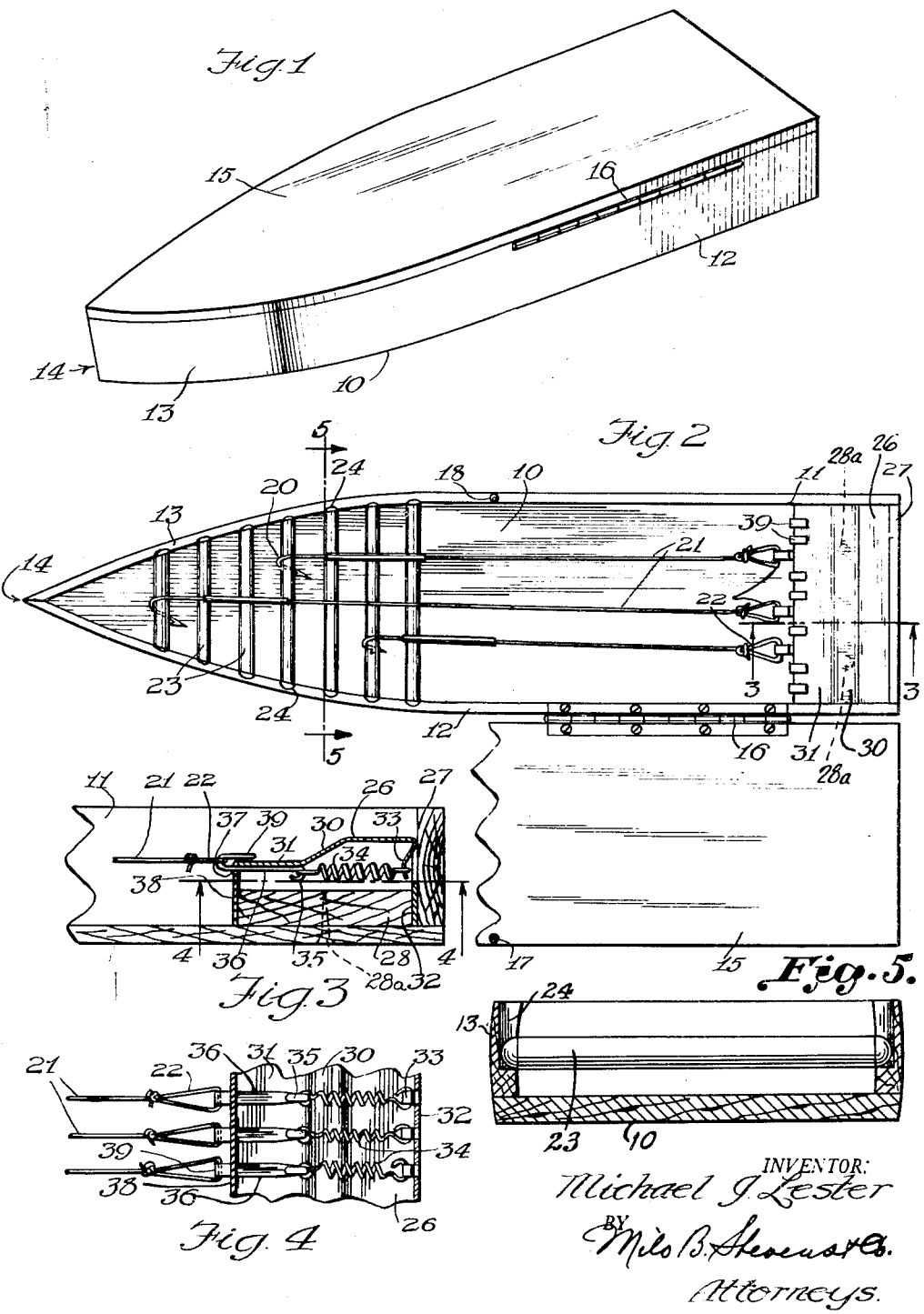
INVENTOR:
Michael J. Lester
BY Milo B. Stevens & Co.
Attorneys.

Patented June 17, 1952

2,600,665

UNITED STATES PATENT OFFICE 2,600,665

FISHHOOK CONTAINER

Michael J. Lester, Chicago, Ill.

Application April 6, 1948, Serial No. 19,199

2 Claims. (Cl. 43—57.5)

My invention relates to boxes or receptacles in which fish hooks are kept, and more particularly to that type which contain means to keep the fish hooks mounted between supports and tensioned to hold their places, and one object is to provide a container of this kind which has a series of dowels in one end for the application of fish hooks of different lengths and a unit in the opposite end for individually tensioning the fish hooks.

A further object is to employ means in the tensioning unit which lend the same a high degree of structural and operative efficiency.

Another object is to dispose the dowels referred to removably in case a repair or replacement is necessary.

An additional object is to form the container in a manner to be neat and compact.

With the above objects in view, and any others which may suggest themselves from the description to follow, a better understanding of the invention may be had by reference to the accompanying drawing, in which—

Fig. 1 is a perspective view of the container in the closed position;

Fig. 2 is a top plan view of the container in the open position, with a portion of the cover broken away;

Fig. 3 is an enlarged section on the line 3—3 of Fig. 2; and

Fig. 4 is a fragmental section on the line 4—4 of Fig. 3.

Fig. 5 is a section on the line 5—5 of Fig. 2 showing the manner of mounting the dowels.

In accordance with the foregoing, specific reference to the drawing indicates the novel container as a long, shallow box 10, which may be made of wood, fibre or plastic material. The box is rectangular at one end; and its front and rear walls—indicated at 11 and 12, respectively—converge curvedly toward the other end, as shown at 13, to terminate with a point 14. The rear wall 12 receives a cover 15 by means of a piano hinge 16; and the cover and front wall have the co-operative elements 17 and 18 of a spring latch.

Fig. 2 shows that the fish hooks having the usual hook portions 20 are carried at the front ends of leaders 21, the rear ends of the latter having loops 22 formed therein. The fish hooks are selectively engageable with a series of transversely positioned dowels 23 whose ends seat in the bottoms of correspondingly positioned vertical guides or grooves 24 cut in the inner sides of the walls 11 and 12. The guides are of curved cross-section; and the ends of the dowels are rounded to fit within the curved guides. The dowels are of such lengths that their ends are adapted to frictionally engage the proper pairs of guides. The dowels therefore hold their positions in the bottom of the guides, but may be raised out of the same in case of repair or replacement.

It is contemplated that the front hook portions 20 of the fish hooks are to be applied to selected dowels 23, the selection being determined by the length of the leaders 21, the hooks containing the longer leaders being applied to the dowels further to the front of the container and those with the shorter leads being applied to the rearmost dowels, selection of the respective dowels depending on the length of the leaders. Each of the hook leaders are provided at their rear ends with leader loops 22, as is usual in leader constructions. The invention embodies a sheet metal unit indicated at 26, the same as a unit extending transversely of the container and being positioned next to the side wall 27 thereof and having downwardly extending oppositely disposed side portions 32 and 38, said portions straddling a block 28 which is secured to the bottom of the container as by screws or nails 28a. The front and rear ends of the member 26 fit frictionally between the front and rear walls 11 and 12 of the box, such a construction permitting the block 28 to hold the sheet metal member 26 next to the wall 27 and preventing the same from moving away therefrom.

The top 26 of the sheet metal member inclines as shown at 30 in a forward direction to a lower level 31; and the outer flange 32 of the sheet metal member is struck inwardly to provide a series of tongues 33. As seen in Figs. 3 and 4, these form attaching means for a series of coil springs 34 leading to the top portion 31. The springs 34 at their forward ends receive the heel bends 35 of a series of flat leader receiving hooks 36. These pass through slots 37 in the forward flange 38 to terminate with bills 39 terminating over the top portion 31, as shown in Fig. 3. The loops 22 of the fish hook leaders 21 engage the correspondingly located hook bills 39.

When a fish hook is desired to be mounted in the box, its loop 22 is first engaged as just stated. The fish hook is then drawn to mount the proper dowel 23 and secure the fish hook in a tensioned condition. When the fish hook and leader are so mounted it will be seen that the hooks 36 are moved forwardly of the flange 38 whereby the spring 34 are put under tension. The fish hook therefore keeps its place in case the box is roughly handled or dropped. A number of fish hooks can thus be mounted in the box as shown in Fig. 2.

Since fewer hooks with long leaders are required, the greater number of dowels for the hooks may be longer to accommodate the larger number of hooks having short leaders; whereby the box is thus tapered to be more compact, its pointed design simulating a boat as the usual environment of its use.

The tensioning unit is a simple and sturdy structure. While it maintains its position in the box because of its engagement with the block 28, it may be pried out with a small screw driver or other handy tool in case it requires any attention or repair. The raised part of the top portion 26 affords a clearance for the operation of the springs 34; and the reduced top portion 31 forms a seating or guiding surface for the flat hooks 36 to keep them from turning. The lower level of the top portion 31 also allows an ample clearance for the hook bills 39 under the box cover 15 or from a hand or any other object passing over the top portion 26.

It is now apparent that the novel container is primarily a fisherman's accessory which is flat or compact enough to be kept in a tackle box or carried in one's pocket. In addition, the container has the several features described above which combine to render it an efficient and useful receptacle for fish hooks.

While I have described the invention along specific lines, various minor changes or refinements may be made therein without departing from its principle, and I reserve the right to employ all such changes and refinements as may come within the scope and spirit of the appended claims.

I claim:

1. The combination with a container for fish hook leaders arranged in laterally-spaced relation, such leaders having fish hooks at their forward ends and loops at their rear ends, and means in the container engageable by said fish hooks; of a sheet metal member located in the container opposite said hook engageable means and formed with front and rear downbent walls, hooks slidable through the front wall and formed with bills receiving said loops, tension springs within the member and in line with the respective hooks, the latter engaging the front ends of the springs, and connecting means extended from said rear wall for the rear ends of the springs, the forepart of the top portion of the member being flat to form a guide on the under side for said hooks, and the rear part of such top being raised to form a clearance for said springs.

2. The combination with a container for fish hook leaders arranged in laterally-spaced relation, such leaders having fish hooks at their forward ends and loops at their rear ends, and means in the container engageable by said fish hooks; of a sheet metal member located in the container opposite said hook engageable means and formed with front and rear downbent walls, hooks slidable through the front wall and formed with bills receiving said loops, tension springs within the member and in line with the respective hooks, the latter engaging the front ends of the springs, and connecting means extended from said rear wall for the rear ends of the springs, the forepart of the top portion of the member being flat to form a guide on the under side for said hooks, the rear part of such top being raised to form a clearance for said springs, and said forepart and rear part being connected by an inclined part.

MICHAEL J. LESTER.

REFERENCES CITED

The following references are of record in the file of this patent:

UNITED STATES PATENTS

| Number | Name | Date |
| --- | --- | --- |
| 197,935 | Holt | Dec. 11, 1877 |
| 1,014,889 | McDonald | Jan. 16, 1912 |
| 1,183,647 | Joyce | May 16, 1916 |
| 1,737,450 | Burch et al. | Nov. 26, 1929 |
| 2,065,234 | Martinez | Dec. 22, 1936 |
| 2,069,661 | Tiede | Feb. 2, 1937 |
| 2,190,647 | Buicke | Feb. 20, 1940 |